US006366479B1

(12) United States Patent
Usui et al.

(10) Patent No.: US 6,366,479 B1
(45) Date of Patent: Apr. 2, 2002

(54) DC-DC CONVERTER WITH REDUCED ENERGY LOSS UNDER LOWERED LOAD IMPEDANCE

(75) Inventors: Hiroshi Usui; Akihiro Uchida, both of Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 09/712,568

(22) Filed: Nov. 14, 2000

(30) Foreign Application Priority Data

Nov. 16, 1999 (JP) .......................................... 11-325179

(51) Int. Cl.⁷ .......................................... H02M 3/335
(52) U.S. Cl. ............................. 363/21.12; 363/21.15; 363/21.16; 363/97
(58) Field of Search ........................... 363/21.01, 21.04, 363/21.07, 21.08, 21.12, 21.15, 21.16, 97

(56) References Cited

U.S. PATENT DOCUMENTS

| | | | |
|---|---|---|---|
| 4,794,270 A | * 12/1988 | Park .............................. | 363/21 |
| 5,461,555 A | * 10/1995 | Kitajima et al. .............. | 363/21 |
| 5,703,764 A | * 12/1997 | Hermann et al. ............. | 363/97 |
| 5,717,578 A | * 2/1998 | Afzal ............................ | 363/97 |
| 5,734,564 A | * 3/1998 | Brkovic ........................ | 363/21 |
| 5,793,621 A | * 8/1998 | Yamada ........................ | 363/21 |
| 5,812,383 A | * 9/1998 | Majid et al. .................. | 363/21 |
| 5,909,363 A | * 6/1999 | Yoon ............................. | 363/21 |
| 6,094,362 A | * 7/2000 | Domingo ...................... | 363/21 |
| 6,111,762 A | * 8/2000 | Igarashi et al. ............... | 363/97 |
| 6,118,675 A | * 9/2000 | Lionetto et al. .............. | 363/21 |

\* cited by examiner

*Primary Examiner*—Jeffrey Sterrett
(74) *Attorney, Agent, or Firm*—Bachman & LaPointe, P.C.

(57) ABSTRACT

The DC-DC converter is provided which comprises a switching element 3 connected in series to a DC power source 1 and a primary winding 2a of a transformer 2; a control circuit 10 for turning the switching element 3 alternately ON and OFF; a second output smoothing circuit 7 connected to a drive winding 2c of the transformer 2 for supplying electric power to the control circuit 10; and a voltage control circuit 26 for detecting output voltage of the drive winding 2c under a trigger level $V_{ON}$ for driving the control circuit 10. The control circuit 10 is operable and inoperable when voltages of a trigger level $V_{ON}$ and an inoperative level $V_{OFF}$ respectively are applied on the control circuit 10. When the load impedance is remarkably lowered, the voltage control circuit 26 can be operated to decrease the output voltage of the second output smoothing circuit 7 to the inoperative level $V_{OFF}$ for ceasing operation of the control circuit 10 when the second output smoothing circuit 7 is electrically charged to the trigger level $V_{ON}$ through the trigger circuit 11.

13 Claims, 7 Drawing Sheets

DC-DC CONVERTER WITH REDUCED ENERGY LOSS UNDER LOWERED LOAD IMPEDANCE

FIELD OF THE INVENTION

This invention relates to a DC-DC converter, in particular of the type capable of reducing the output electric current upon impedance drop of a load resulted from for example a short-circuited condition of the load.

PRIOR ART

A prior art DC-DC converter typically includes a transformer which has a primary winding connected in series to a DC power source and a switching transistor, and a secondary winding connected through a smoothing circuit to output terminals for applying an output voltage on a load. A control circuit produces output pulses to the switching transistor which is thereby intermittently turned ON and OFF to generate electric current from the DC power source through the primary winding of the transformer and switching transistor. Electric current through the primary winding provides the transformer with electric energy to be converted into electric current through the secondary winding so that the electric current flows from the secondary winding through the smoothing circuit and output terminals. The secondary winding and smoothing circuit produce the output voltage of the level different from that of the DC power source due to a turn ratio of the primary to secondary winding. Also, the output voltage can be adjusted to an appropriate level by controlling the pulse width of ON signals supplied to the base or gate terminal of the switching transistor from the control circuit. If the output voltage is increased to a higher level than a regular level, the control circuit produces output pulses of narrower time width to the control terminal of the switching transistor to reduce the ON period of time for the switching transistor. Adversely, if the output voltage is reduced to a lower level than the regular level, the control circuit produces output pulses of wider time width to the control terminal of the switching transistor to expand the ON period of time for the switching transistor.

In most cases, recent DC-DC converters require reduced electric power consumption in a short-circuited condition of the load as well as during the regular operative condition of the load. Each of these DC-DC converters includes the control circuit which comprises a hybrid integrated circuit called as "Bi-CMOS" of a bipolar element and a CMOS (Complimentary Metal Oxide Semiconductor) element to reduce the consumed electric power in the control circuit. However, when the load impedance remarkably drops due to for example the short-circuited condition of the load, the output electric current uncontrollably increases to thereby cause damage to or destroy of the smoothing circuit through which the increased electric current flows.

An object of the present invention is to provide a DC-DC converter capable of reducing the output electric current upon impedance drop of a load resulted from for example a short-circuited condition of the load. Another object of the invention is to provide a DC-DC converter which can prevent damage to or destroy of an electric element through which the output electric current flows.

SUMMARY OF THE INVENTION

The DC-DC converter according to the present invention comprises a transformer (2) having a primary winding (2a), secondary winding (2b) and a drive winding (2c); a switching element (3) connected in series to a DC power source (1) and the primary winding (2a); a first output smoothing circuit (4) connected to the secondary winding (2b) and output terminals; and a control circuit (10) for generating outputs to drive the switching element (3). When voltage of a trigger level ($V_{ON}$) is applied on the control circuit (10), it is operable to produce output pulses in order to alternately turn the switching element (3) ON and OFF for generation of the stabilized output from the output terminals through the first output smoothing circuit (4), however, the control circuit (10) is inoperable when voltage of an inoperative level ($V_{OFF}$) is applied on the control circuit (10). The DC-DC converter further comprises a trigger circuit (11) for supplying electric power from the power source (1) to the control circuit (10) at the beginning of operating the control circuit (10); a second output smoothing circuit (7) connected to the drive winding (2c) for supplying electric power to the control circuit (10); and a voltage control circuit (26) for detecting the output voltage ($V_{cc}$) of the drive winding ($2_c$) under the trigger level ($V_{ON}$) for driving the control circuit (10).

When the load impedance is remarkably lowered by such as a short-circuited condition which may happen in a load (25), the voltage control circuit (26) can be operated to forcibly decrease the output voltage of the second output smoothing circuit (7) to the inoperative level ($V_{OFF}$) for ceasing operation of the control circuit (10) when the second output smoothing circuit (7) is electrically charged to the trigger level ($V_{ON}$) through the trigger circuit (11). The forcible decreasing of the output voltage of the second output smoothing circuit (7) is very effective to shorten time width of the ON output voltage ($V_O$) during the intermittently oscillating operation of the converter, thus reducing the output current.

In another embodiment of the invention, the transformer (2) may have a detective winding (2d); a second output smoothing circuit (34) connected to the detective winding (2d); and a voltage control circuit (26) for detecting output voltage of the detective winding (2d) under a trigger level ($V_{ON}$) for driving the control circuit (10). In a further embodiment of the invention, a transformer (2) has an autotransformer (37) with a primary winding (2a), a drive winding (2c), a tap (37b) provided in the primary winding (2a) of the autotransformer (37) and a first output smoothing circuit (4) connected between an end and the tap (37b) of the primary winding (2a) and to output terminals.

The voltage control circuit (26) is operable to increase the output voltage ($V_{cc}$) of the second output smoothing circuit (7) when the load impedance is restored to a normal level so that the drive winding (2c) produces the voltage above the trigger level ($V_{ON}$). The second output smoothing circuit (7) comprises a capacitor (9) connected to the control circuit (10). The voltage control circuit (26) comprises a threshold circuit (28) for detecting the voltage of the drive winding (2c) under the trigger level ($V_{ON}$); and a deactivating circuit (30 to 33) for discharging the electric charge accumulated in the capacitor (9) to the inoperative level ($V_{OFF}$) for ceasing operation of the control circuit (10) when the threshold circuit (28) detects the voltage of the drive winding ($2_c$) under the trigger level ($V_{ON}$). The deactivating circuit (30 to 33) comprises a switching circuit (31, 32) connected in parallel to the capacitor (9) for discharging the electric charge in the capacitor (9) to the inoperative level ($V_{OFF}$) for ceasing operation of the control circuit (10) when the threshold circuit (28) detects the voltage of the additional winding (2c, 2d) under the trigger level ($V_{ON}$). Another embodiment of the instant invention may comprise a transformer (2) of an autotransformer (37) with a detective winding (2d).

BRIEF DESCRIPTION OF THE DRAWINGS

These as well as other objects of the present invention will become apparent during the course of the following description with reference to the accompanying drawings, in which.

DETAILED DESCRIPTION OF THE INVENTION

Referring now to the accompanying drawings, a prior art DC-DC converter and embodiments of the present invention will be described hereinafter in reference to FIGS. 1 to 7 wherein same reference symbols are applied to indicate similar components in these drawings.

Figure 1:
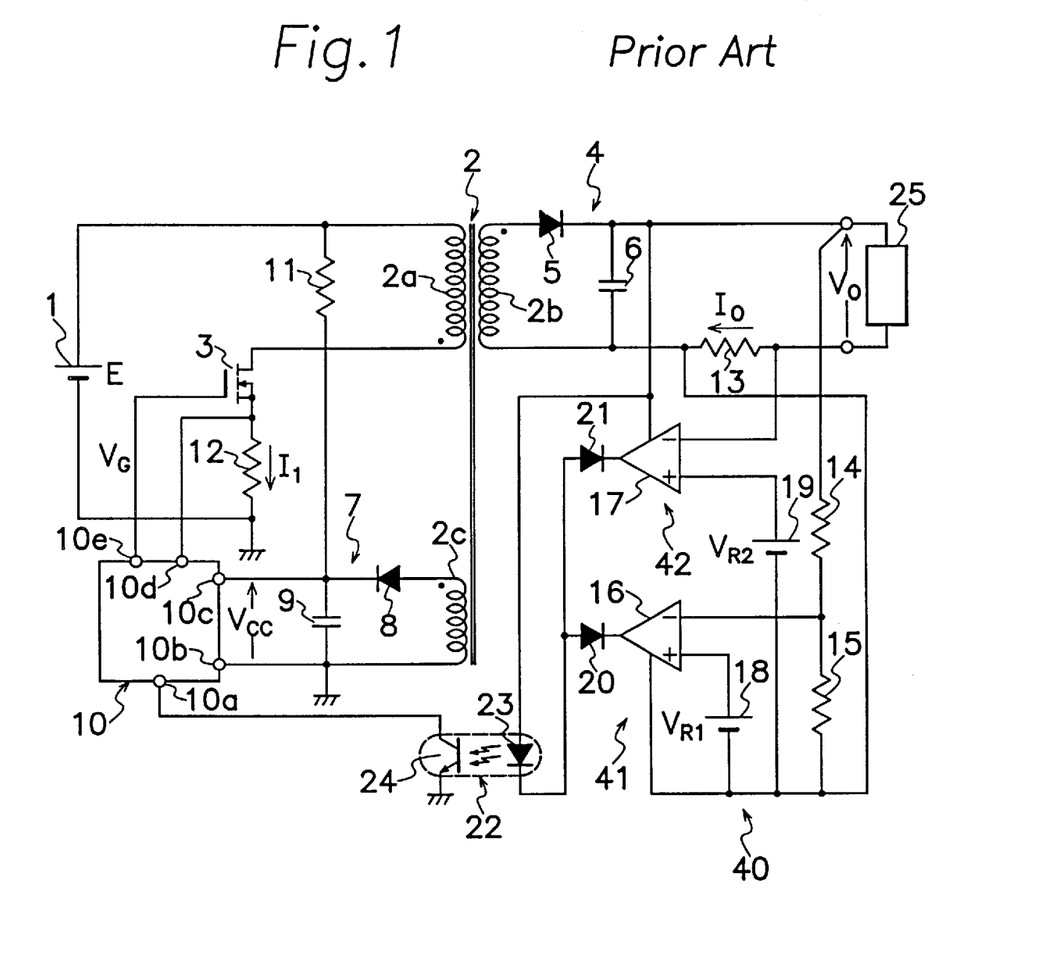
FIG. 1 is an electric circuit diagram of a prior art DC-DC converter.

FIG. 1 illustrates an electric circuit diagram of a typical flyback DC-DC converter which comprises a transformer 2 with a primary winding 2a in series connection with a battery or DC power supply 1 and a switching element, or MOS-FET (Field Effect Transistor) 3. In some cases, the power supply 1 may include a rectifying circuit of capacitor input type. The transformer 2 has a secondary winding 2b connected to output terminals through a first output smoothing circuit 4 which comprises a rectifying diode 5 connected to the secondary winding 2b and a smoothing capacitor 6 connected between the output terminals in parallel to the secondary winding 2b and rectifying diode 5 and to a load 25 connected between the output terminals.

The transformer 2 also has a drive winding 2c connected to input terminals 10b, 10c of a control circuit 10 through a second output smoothing circuit 7 which comprises a rectifying diode 8 connected to the drive winding 2c and a capacitor 9 connected between the input terminals 10b, 10c. A resistor 11 is provided in a trigger circuit connected between the power supply 1 and the input terminal 10c of the control circuit 10 to supply electric power to the control circuit 10 at the beginning of the operation. During operation of the transformer 2, the drive winding 2c generates electric power supplied to the control circuit 10 which generates pulsed outputs to a gate terminal of the MOS-FET 3 to alternately turn same ON and OFF. A detective resistor 12 is connected between the MOS-FET 3 and power supply 1 to detect a level of electric current flow through the primary winding 2a and MOS-FET 3 at a detective input terminal 10d of the control circuit 10.

Connected to the output terminals to the load 25 is a discerning circuit 40 which comprises a voltage discerning circuit 41 and a current discerning circuit 42. The voltage discerning circuit 41 comprises voltage dividing resistors 14, 15; a power source 18 of reference voltage; and a first differential amplifier 16 which has an inverted input terminal connected to a junction between the voltage dividing resistors 14, 15 and a non-inverted input terminal connected to the power source 18. The current discerning circuit 42 comprises a resistor 13 connected in a line between the secondary winding 2b and one of the output terminals for detecting the current value across the line; a power source 19 of reference voltage; a second differential amplifier 17 which has an inverted input terminal connected to the resistor 13 and a non-inverted input terminal connected to the power source 19.

A photocoupler 22 includes a pair of a light emitting diode 23 and a phototransistor 24 which is connected to an input terminal 10a of the control circuit 10 for providing the control circuit 10 with electric signals indicative of the output level to the load 25 through the photocoupler 22. An anode of the light emitting diode 23 is connected to one of the output terminals to the load 25, and a cathode of the light emitting diode 23 is connected to the output terminals of the first and second differential amplifiers 16, 17 respectively through diodes 20, 21.

At the beginning of operating the DC-DC converter, electric current flows from the power supply 1 through the resistor 11 to the capacitor 9 of the second output smoothing circuit 7, and thereby the capacitor 9 is electrically charged to an input voltage level $V_{cc}$ which is applied to the power input terminal 10c of the control circuit 10 for activation. Accordingly, the control circuit 10 produces pulsed control signals $V_G$ to the gate terminal of the MOS-FET 3 to turn the MOS-FET 3 alternately ON and OFF so that the voltage E of the power source 1 is intermittently applied on the primary winding 2a of the transformer 2 to induce attendant voltage on the secondary winding 2b. Due to the attendant voltage, electric current flows from the secondary winding 2b through the rectifying diode 5 and smoothing capacitor 6 of the first output smoothing circuit 4 to average and generate from the output terminals the stabilized output which has the voltage level $V_O$ different from the voltage level E of the power source 1. Simultaneously, derived in the drive winding 2c of the transformer 2 is a drive voltage applied on the capacitor 9 through the rectifying diode 8 of the second output smoothing circuit 7. Accordingly, once the converter starts working after the triggered voltage $V_{ON}$ is applied to the control circuit 10, it continues to work by the DC power supplied from the drive winding 2c through the second output smoothing circuit 7 to the input terminal 10c.

When the DC output voltage $V_O$ is applied on the load 25, the voltage dividing resistor 15 detects the level of the output voltage $V_O$ which is given to the inverted terminal of the differential amplifier 16 for comparison with the reference voltage $V_{R1}$ of the power source 18. Simultaneously, the resistor 13 detects the voltage level relative to the electric current through the load 25, and the detected voltage is applied on the inverted terminal of the differential amplifier 17 which compares the detected voltage and the reference voltage $VR_2$ of the power source 19. The comparative outputs from the differential amplifiers 16, 17 are supplied through the diodes 20, 21 to the light emitting diode 23 of the photocoupler 22 which transmits the comparative outputs from the differential amplifiers 16, 17 to the corrective terminal 10a of the control circuit 10 through the phototransistor 24. When the input electric current $I_1$ passes through the secondary winding 2a and MOS-FET 3, the detective resistor 12 produces a detective voltage relative to the level of electric current $I_1$ through the MOS-FET 3 to provide the detective input terminal 10d with the detected voltage. When the control circuit 10 generates output pulses $V_G$ to the MOS-FET 3, it modulates the time width of the output pulses $V_G$ in accordance with the level of the input signals to the corrective and detective input terminals 10a, 10d to control the ON/OFF periods of time of the MOS-FET 3. Specifically, when the output voltage $V_O$ is higher or when the level of the output electric current is higher, the differential amplifier 16 or 17 produces a higher output to the light emitting diode 23, and therefore, the electric current through the photo-transistor 24 is increased. In this case, the control circuit 10 narrows the time width of the "ON" outputs to the gate terminal of the MOS-FET 3 to reduce the output voltage $V_O$ or the level of the output electric current. Adversely, when the output voltage $V_O$ is lower or when the level of the output electric current is lower, the differential amplifier 16 or 17 produces a lower output to the light emitting diode 23, and therefore, the electric current through the phototransistor 24 is decreased. In this case, the control circuit 10 widens the time width of the "ON" outputs to the gate terminal of the MOS-FET 3 to increase the output voltage $V_O$ or the level of the output electric current. Similarly, when the electric current through the resistor 12 is higher or lower, the control circuit 10 detects the level of the electric current at the input terminal 10d and narrows or widens the time width of the "ON" outputs to the gate terminal of the MOS-FET 3 to maintain the output voltage $V_O$ stable.

Figure 2:
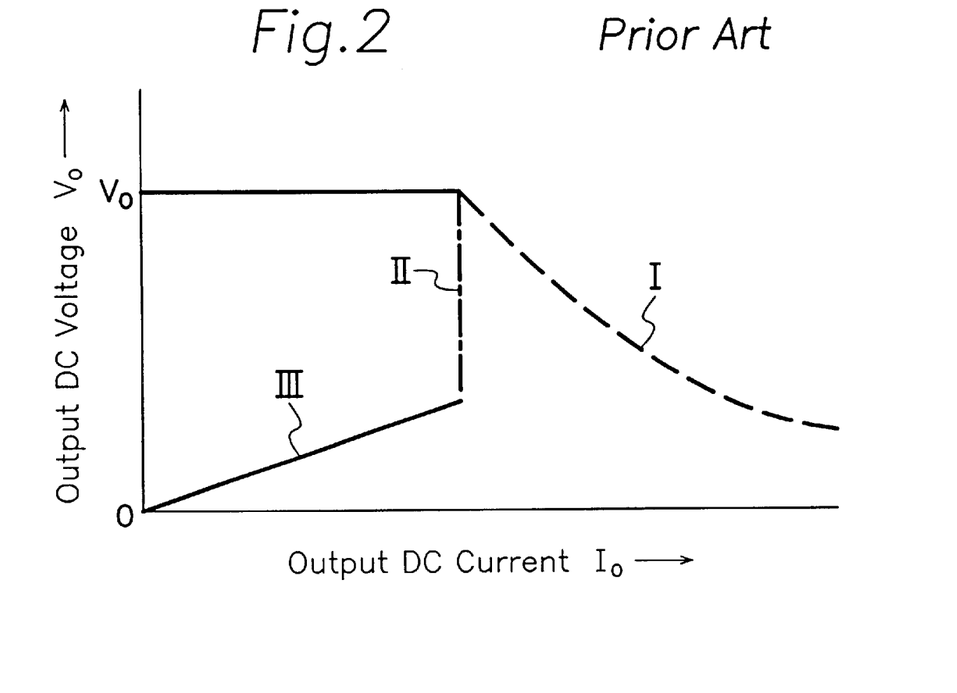
FIG. 2 is a graph showing change in the output voltage with change in the output current of the DC-DC converter shown in FIG. 1.

Generally, a typical prior art DC-DC converter utilizes the only detective resistor 12 for detecting the level of the input current $I_1$ through the primary winding 2a to control the ON/OFF period of the MOS-FET 3 by the detected level of the input current $I_1$ in order to adjust the level of the output electric power. In this converter, however, the DC output current $I_O$ through the secondary winding 2b is rapidly increased when a load impedance is lowered by for example a short-circuited condition of the load 25, and therefore the increased DC output current 10 may destroy or damage the first output smoothing circuit 4, in particular the rectifying diode 5. To prevent such damage to the first output smoothing circuit 4, the detective resistor 13 is provided in the secondary winding side as shown in FIG. 1 to inhibit the rapid increase in the output current $I_O$ through the secondary winding 2b by adjusting the ON/OFF period of time for the MOS-FET 3 in response to the detected voltage on the detective resistor 13. Change in the output voltage $V_O$ of the DC-DC converter shown in FIG. 1 is shown in FIG. 2 wherein a dotted line I indicates the constant electric power control area which means a constant product of the DC output voltage $V_O$ by the DC output electric current $I_O$; a chain line II indicates the constant DC electric current control area.

Figure 3:
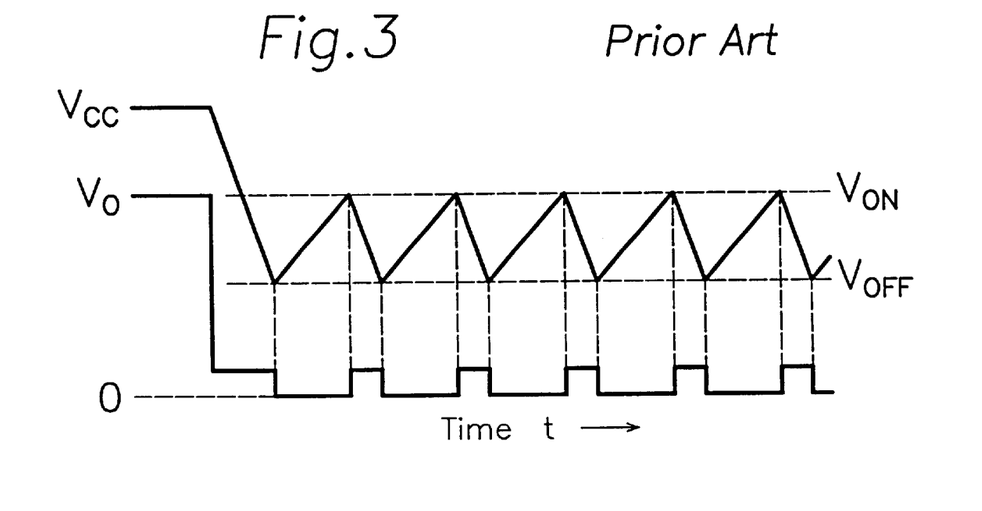
FIG. 3 is a graph showing change in output voltage between output terminals and change in input voltage applied on a control circuit in the DC-DC converter of FIG. 1 upon a drop of a load impedance.

When impedance of the load 25 is significantly lowered, the DC output voltage $V_O$ suddenly drops as shown in FIG. 3, and therefore, the differential amplifier 16 produces the lower output. Accordingly, the light emitting diode 23 of the photocoupler 22 emits the light with the lower intensity so that the electric current through the phototransistor 24 is decreased. Simultaneously, the input voltage $V_{CC}$ applied on the control circuit 10 is lowered, and finally the operation of the control circuit 10 is ceased when the voltage $V_{CC}$ falls to the lowermost inoperative voltage $V_{OFF}$ so that operation of the DC-DC converter is ceased with the substantially zero voltage $V_O$ of the DC output. Then, the smoothing capacitor 9 of the second output smoothing circuit 7 is electrically charged by electric current from the DC power source 1 through the trigger resistor 11, and the control circuit 10 again starts to operate when the input voltage $V_{CC}$ reaches the trigger voltage $V_{ON}$. Then, the DC-DC converter again starts to operate and generate the DC output voltage $V_O$ of the minimum level by the intermittently oscillating operation of the DC-DC converter, alternately repeatedly starting and stopping the operation.

In this way, the DC-DC converter shown in FIG. 1 performs the intermittently oscillating operation when the impedance of the load 25 is remarkably lowered so that the intermittent current $I_O$ flows through the load 25 with the reduced average of the output current $I_O$ to restrict the DC output current through the load 25. A solid line III shown in FIG. 2 indicates the output voltage $V_O$ at the time of the intermittently oscillating operation of the DC-DC converter. In this case, an appropriate adjustment of the voltage on the drive winding 2c of the transformer 2 allows relatively stable and intermittently oscillating operation.

Although the control circuit 10 shown in FIG. 1 comprises Bi-CMOS which consumes a low amount of electric power, the drive winding 2c of the transformer 2 cannot supply a reasonable amount of electric current to the control circuit 10 during the intermittently oscillating operation of the DC-DC converter to generate the reduced output electric current. In other words, some element of the first output smoothing circuit 4 may be damaged because of an excessive amount of electric current flowing from the secondary winding 2b through the load 25 during the intermittently oscillating operation of the DC-DC converter, and the excessive amount of electric current passing through the first output smoothing circuit 4 was uncontrollable in prior art DC-DC converters.

The DC-DC converter according to embodiments of the present invention are described in connection with FIGS. 4 to 7.

Figure 4:
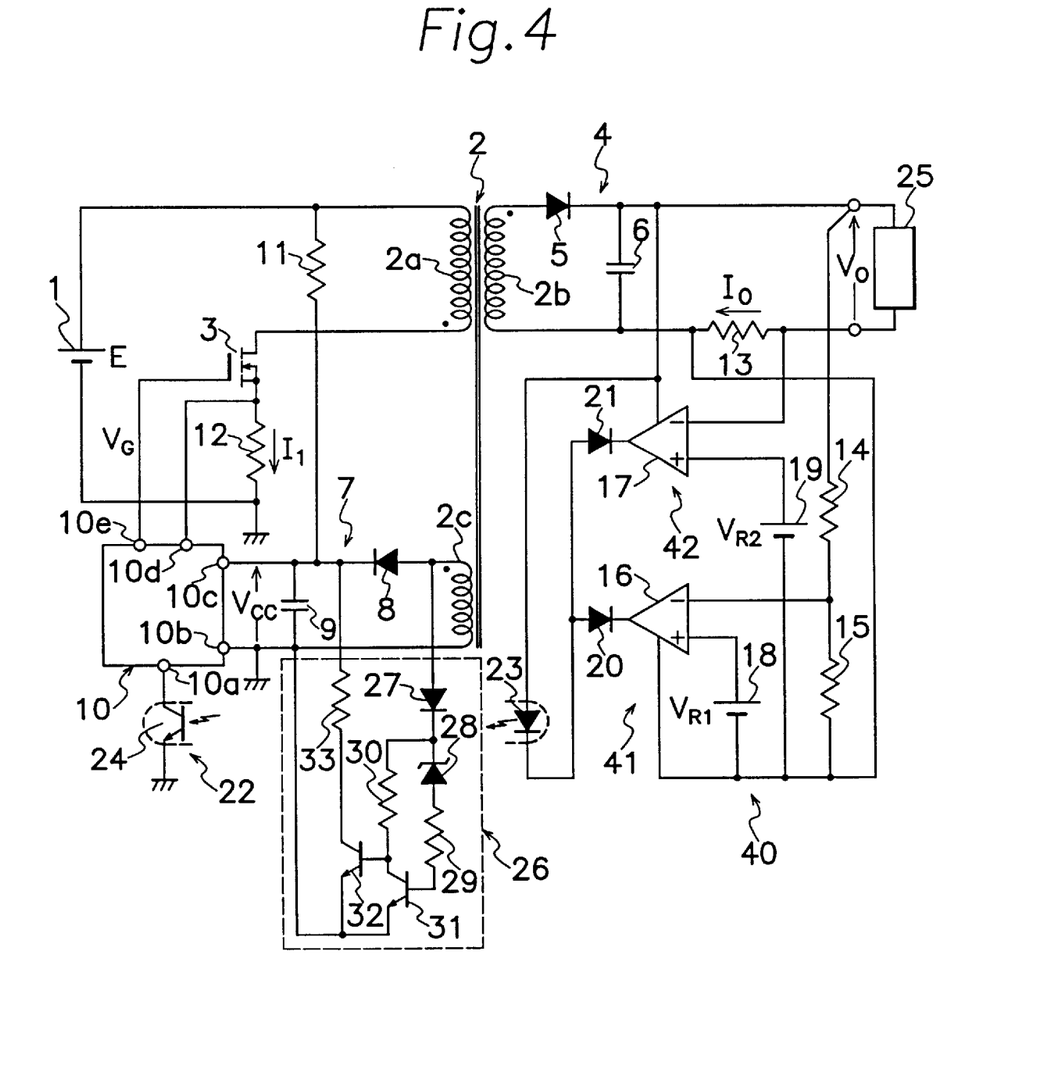
FIG. 4 is an electric circuit diagram showing a preferred embodiment of a DC-DC converter according to the present invention.

As shown in FIG. 4, the DC-DC converter according to the present invention comprises a voltage control circuit 26 for detecting output voltage of the drive winding 2c under a trigger level $V_{ON}$ for driving the control circuit 10. The voltage control circuit 26 comprises a rectifying diode 27, a Zener diode 28, resistors 29, 30 and 33 and transistors 31 and 32. The Zener diode 28 forms a threshold circuit for detecting the voltage of the drive winding 2c under the trigger level $V_{ON}$. The resistor 30 and transistors 31, 32 form a deactivating circuit for discharging the electric charge accumulated in the capacitor 9 to the inoperative level $V_{OFF}$ for ceasing operation of the control circuit 10 when the threshold circuit 28 detects the voltage of the drive winding 2c under the trigger level $V_{ON}$. The transistors 31, 32 form a switching circuit connected in parallel to the capacitor 9 for discharging the electric charge in the capacitor 9 to the inoperative level $V_{OFF}$. The anode of the rectifying diode 27 is connected between the drive winding 2c and the rectifying diode of the second output smoothing circuit 7, and the cathode of the rectifying diode 27 is connected to a cathode of the Zener diode 28 of which anode is connected to the base terminal of the NPN transistor 31 via resistor 29. A collector terminal of the NPN transistor 31 is connected between the rectifying diode 27 and Zener diode 28 via resistor 30 and to a base terminal of the NPN transistor 32 of which collector is connected to the input terminal 10c of the control circuit 10 via the resistor 33. Each emitter terminal of the NPN transistors 31 and 32 is connected to the ground or the input terminal 10b of the control circuit 10. In this case, applied on the junction between the rectifying diode 27 and Zener diode 28 is a rectified voltage substantially equal to the input voltage $V_{CC}$ applied on the input terminal 10c of the control circuit 10 through the second output smoothing circuit 7. In other words, the breakdown voltage of the Zener diode 28 is designed to generally be equivalent to the voltage value of the trigger voltage $V_{ON}$ of the control circuit 10.

Figure 5:
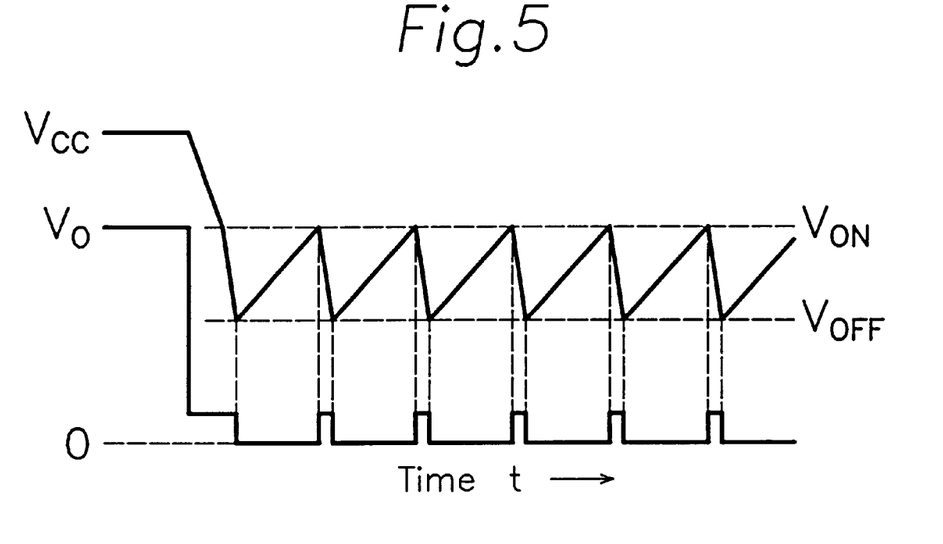
FIG. 5 is a graph showing change in output voltage between output terminals and change in input voltage applied on a control circuit in the DC-DC converter of FIG. 4 upon a drop of a load impedance.

When impedance is remarkably lowered by such as a short-circuited condition which may happen in the load 25, the output voltage $V_O$ applied from the first output smoothing circuit 4 on the load 25 drops as shown in FIG. 5, and simultaneously, the drive voltage generated by the drive winding 2c of the transformer 2 descends so that the voltage $V_{CC}$ applied on the input terminal 10c of the control circuit 10 falls under the trigger voltage $V_{ON}$. Accordingly, the rectified voltage on the Zener diode 28 substantially equal to the voltage $V_{CC}$ is lowered under the trigger voltage $V_{ON}$ and under the breakdown voltage of the Zener diode 28 which is then turned OFF. This turns the transistors 31 and 32 respectively OFF and ON to thereby discharge the electric charge accumulated in the smoothing capacitor 9 of the second output smoothing circuit 7 by the electric current flowing through the resistor 33 and transistor 32 so that the voltage $V_{CC}$ rapidly drops to an inoperative voltage $V_{OFF}$ for ceasing operation of the control circuit 10. Because the operation of the DC-DC converter stops, the DC output voltage becomes approximately zero voltage.

Subsequently, the smoothing capacitor 9 of the second output smoothing circuit 7 is electrically charged by electric current from the power source 1 through the trigger resistor 11, and the control circuit 10 again starts to operate when the voltage $V_{CC}$ on the smoothing capacitor 9 increases to the trigger voltage $V_{ON}$ so that the DC-DC converter again starts to generate the DC output voltage $V_O$ of the minimum level. Then, the voltage control circuit 26 can be operated to decrease the output voltage of the second output smoothing circuit 7 when the second output smoothing circuit 7 is electrically charged to the trigger level $V_{ON}$ through the trigger circuit 11. In this way, the starting and stopping of the DC-DC converter are alternately repeated for the intermittently oscillating operation.

The decreasing of the output voltage of the second output smoothing circuit 7 is very effective to narrow the time width of the ON output voltage $V_O$ during the intermittently oscillating operation of the converter, thus reducing the output current. After the load impedance is restored to a normal level, the drive winding 2c produces a voltage above the trigger level $V_{ON}$ so that the Zener diode 28 generates the output to the base terminal of the transistor 31 which is then turned ON to switch the transistor 32 to OFF. Accordingly the voltage control circuit 26 is operated to increase the output voltage $V_{CC}$ of the second output smoothing circuit 7 when the drive winding 2c produces the voltage above the trigger level $V_{ON}$, thereby preventing discharge of the capacitor 9 for normal operation of the DC-DC converter.

Figure 6:
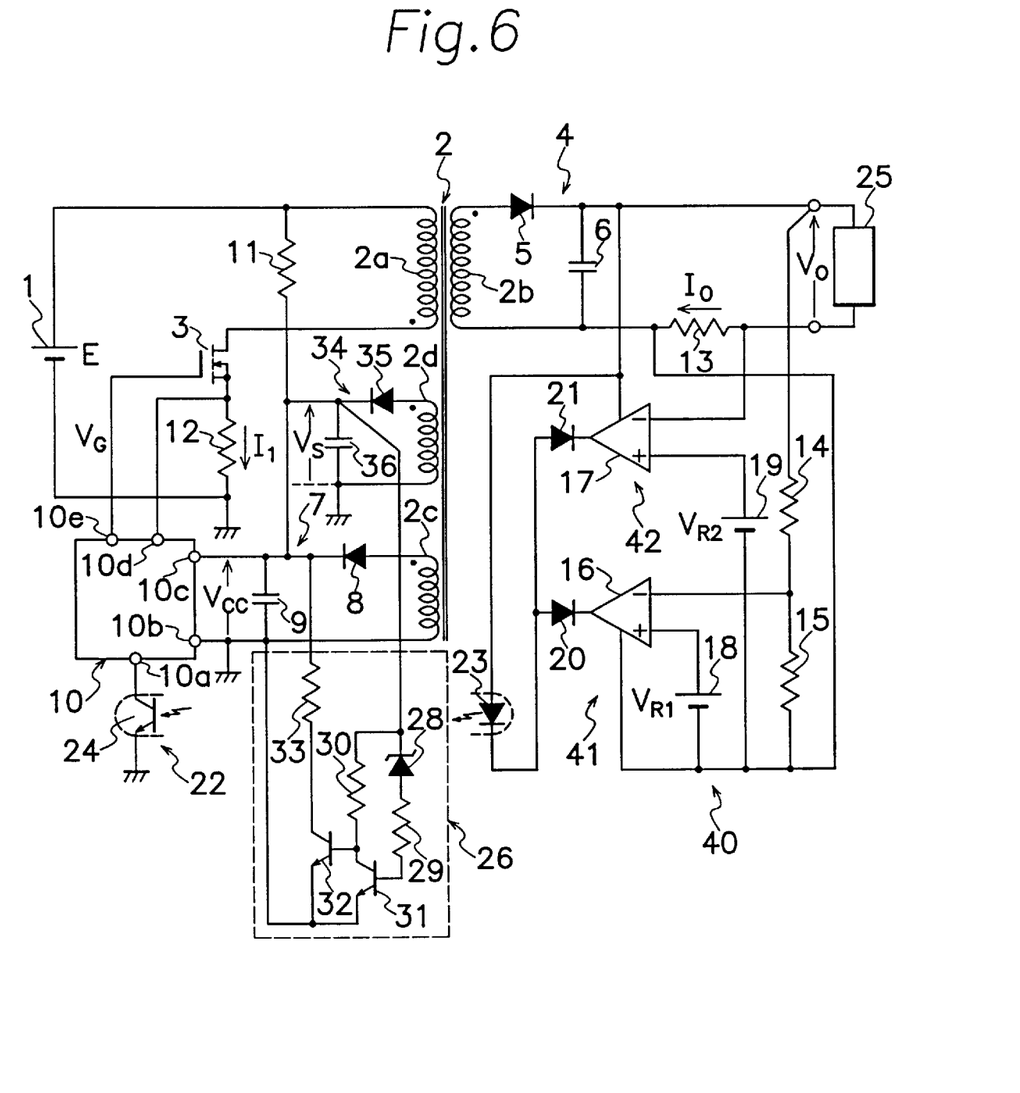
FIG. 6 is an electric circuit diagram showing another embodiment of the present invention.

FIG. 6 shows another embodiment of the instant invention wherein the transformer 2 has a detective winding 2d; a second output smoothing circuit 34 connected to the detective winding 2d; and a voltage control circuit 26 for detecting output voltage of the detective winding 2d under a trigger level $V_{ON}$ for driving the control circuit 10. Since the detective winding 2d produces the voltage proportional to the level of the output voltage $V_O$ during operation of the DC-DC converter, the voltage control circuit 26 can detect the output voltage $V_O$ when the load impedance is lowered like the voltage control circuit 26 shown in FIG. 4.

Figure 7:
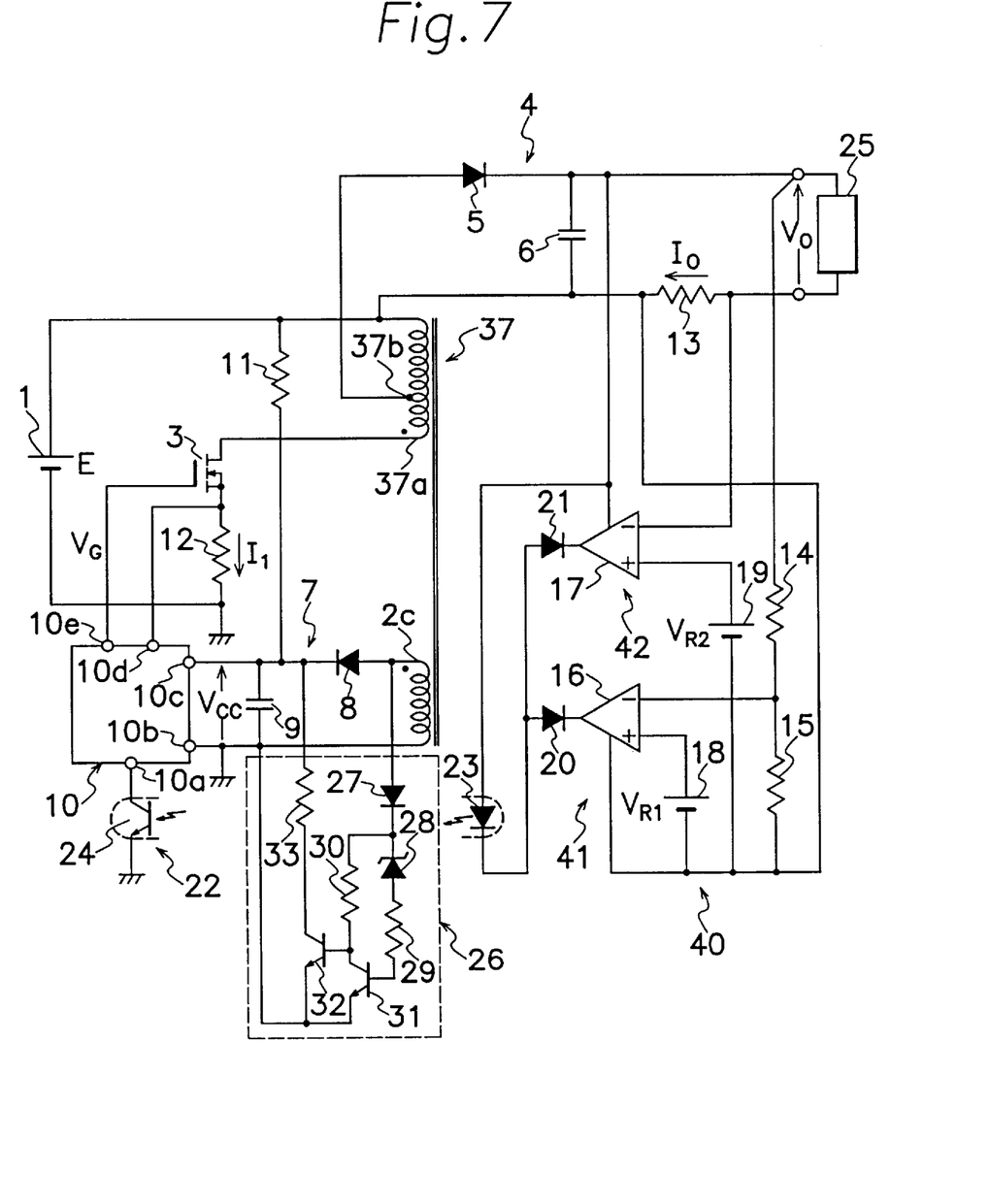
FIG. 7 is an electric circuit diagram showing a further embodiment of the present invention.
Figure 8:
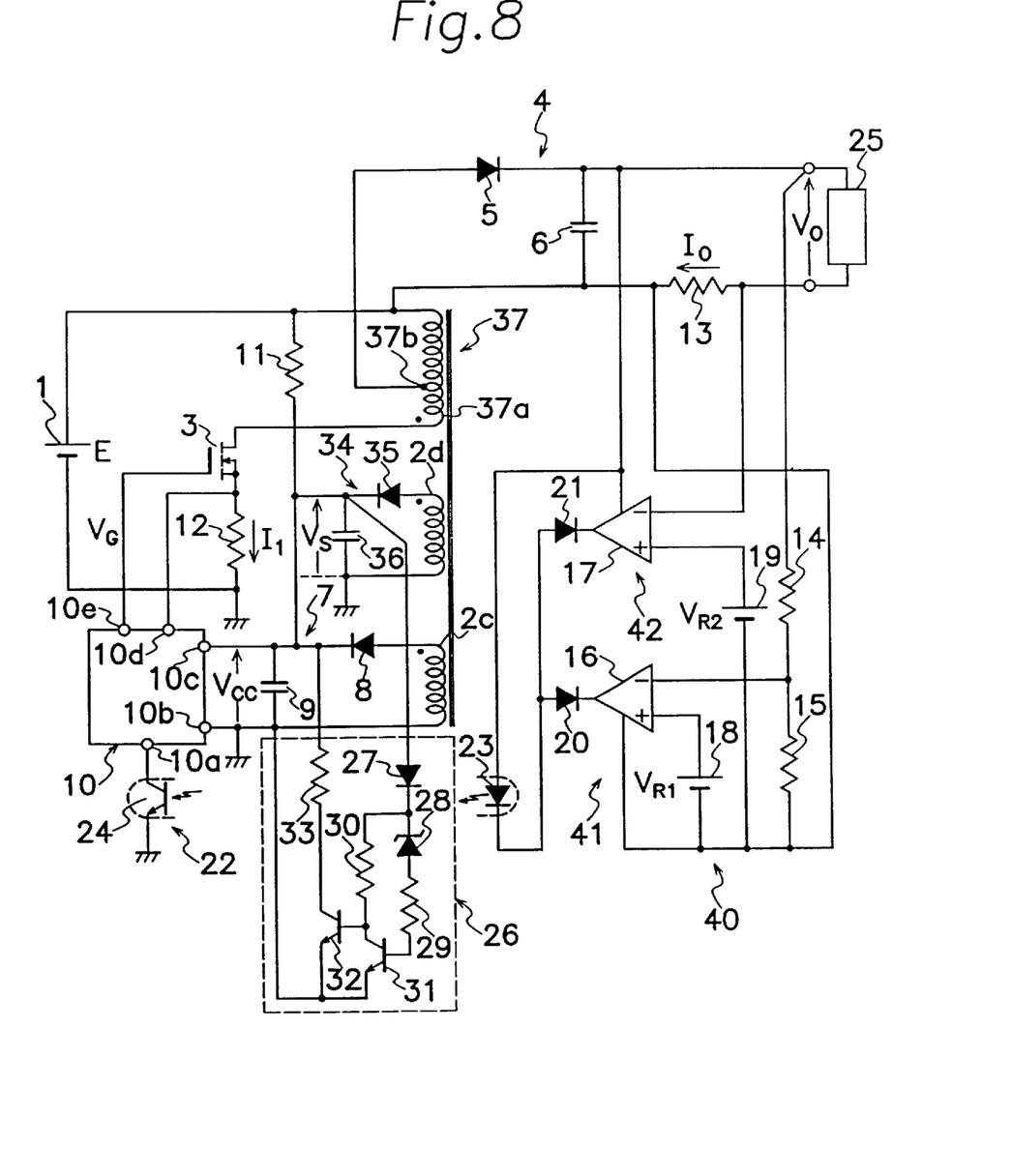
FIG. 8 is an electric circuit diagram showing a further embodiment of the present invention.

FIG. 7 illustrates a further embodiment of the invention wherein the transformer 2 has an autotransformer 37 with a primary winding 2a, a tap 37b provided in the primary winding 37a of the autotransformer 37 and a first output smoothing circuit 4 connected between an end and the tap 37b of the primary winding 37a and with output terminals. A further variation of the embodiment, as shown in FIG. 8, may comprise a transformer 2 of an autotransformer 37 with a detective winding 2d by adding the detective winding 2d shown in FIG. 6 to the autotransformer 37 shown in FIG. 7.

The embodiments of the present invention can produce the following effects during the intermittently oscillating operation of the converter:

1. The output current can be reduced.
2. Damage of the rectifying diode 5 or other electric elements connected to the secondary winding 2b can be prevented under the reduced current.
3. The control circuit 10 may comprise Bi-CMOS with the lower consumed electric power.
4. The DC-DC converter has its higher efficiency and lower energy loss in operation.
5. With higher resistor value of the resistor 11, less energy loss through the resistor 11 is attained.

The present invention is not limited to the foregoing embodiments, and more various kinds of variations in the embodiments can be made. For example, in lieu of the MOS-FET 3, another type of switching element may be employed such as a bipolar transistor, an IGBT (an insulation gate type bipolar transistor), a J-FET (a joining type electric field effect transistor) or a thyristor. Also, in the autotransformer 37 shown in FIG. 7, the tap 37b may be provided at an extension from an end of the primary winding 37a to adjust the output voltage. Moreover, the present invention can be applied to a DC-DC converter of the forward type as well as fryback type.

As mentioned above, the present invention can attain the DC-DC converter with the reduced energy loss during intermittently oscillating operation at the time of impedance drop in the load and with decrease in the output electric current.

What is claimed are:

1. A DC-DC converter comprising a transformer having a primary winding and a drive winding, said transformer being an autotransformer which has a tap provided in said primary winding of said autotransformer;

a first output smoothing circuit connected between an end and said tap of said primary winding and with output terminals;

a switching element connected in series to a DC power source and said primary winding;

a control circuit for generating outputs to drive said switching element, said control circuit being operable and inoperable when voltages of a trigger level and an inoperative level respectively are applied on said control circuit;

a trigger circuit for supplying electric power from said power source at the beginning of operating said control circuit;

a second output smoothing circuit connected to said drive winding for supplying electric power to said control circuit; and a voltage control circuit for detecting output voltage of said drive winding under a trigger level for driving said control circuit, said voltage control circuit being operable to decrease the output voltage of the second output smoothing circuit to an inoperative level for ceasing operation of the control circuit when said second output smoothing circuit is electrically charged to the trigger level through said trigger circuit.

2. A DC-DC converter comprising a transformer having a primary winding and a drive winding and a detective winding, said transformer being an autotransformer which has a tap provided in said primary winding of said autotransformer;

a first output smoothing circuit connected between an end and said tap of said primary winding and to output terminals;

a switching element connected in series to a DC power source and said primary winding;

a control circuit for generating outputs to drive said switching element, said control circuit being operable and inoperable when voltages of a trigger level and an inoperative level respectively are applied on said control circuit;

a trigger circuit for supplying electric power from said power source at the beginning of operating said control circuit;

a second output smoothing circuit connected to said drive winding for supplying electric power to said control circuit; and a voltage control circuit for detecting output voltage of said detective winding under a trigger level for driving said control circuit, said voltage control circuit being operable to decrease the output voltage of the second output smoothing circuit to an inoperative level for ceasing operation of the control circuit when said second output smoothing circuit is electrically charged to the trigger level through said trigger circuit.

3. A DC-DC converter comprising:

a transformer having a primary winding, a drive winding and a tap provided in said primary winding;

a first output smoothing circuit connected between an end and said tap of said primary winding and with output terminals;

a switching element connected in series to a DC power source and said primary winding;

a control circuit for generating outputs to drive said switching element, said control circuit being operable and inoperable when voltages of a trigger level and an inoperative level respectively are applied on said control circuit;

a second output smoothing circuit connected to said drive winding for supplying electric power to said control circuit; and a voltage control circuit for detecting output voltage of said drive winding under a trigger level for driving said control circuit, said voltage control circuit being operable to decrease the output voltage of the second output smoothing circuit to an inoperative level for ceasing operation of the control circuit when said voltage control circuit detects the output voltage of said drive winding under a trigger level for driving said control circuit.

4. A DC-DC converter as defined in claim 3, further comprising a trigger circuit for supplying electric power from said power source to said control circuit at the beginning of operating said control circuit;

wherein said voltage control circuit is operable to decrease the output voltage of the second output smoothing circuit to an inoperative level for ceasing operation of the control circuit when said voltage control circuit detects the voltage of said drive winding under the trigger level after said capacitor is electrically charged to the trigger level through said trigger circuit for activation of said control circuit.

5. A DC-DC converter as defined in claim 3, wherein said second output smoothing circuit comprises a capacitor connected to said control circuit;

said voltage control circuit comprises a detection circuit for detecting the voltage of said drive winding under the trigger level; and a deactivating circuit for discharging the electric charge accumulated in said capacitor to the inoperative level for ceasing operation of the control circuit when said detection circuit detects the voltage of said drive winding under the trigger level.

6. A DC-DC converter comprising:

a transformer having a primary winding, a drive winding, a detective winding, and a tap provided in said primary winding;

a first output smoothing circuit connected between an end and said tap of said primary winding and to output terminals;

a switching element connected in series to a DC power source and said primary winding;

a control circuit for generating outputs to drive said switching element, said control circuit being operable and inoperable when voltages of a trigger level and an inoperative level respectively are applied on said control circuit;

a second output smoothing circuit connected to said drive winding for supplying electric power to said control circuit, said second output smoothing circuit including a capacitor connected to said control circuit; and a voltage control circuit for detecting output voltage of said detective winding under a trigger level for driving said control circuit, said voltage control circuit being operable to decrease the output voltage of the second output smoothing circuit to an inoperative level for ceasing operation of the control circuit when said second output smoothing circuit is electrically charged to the trigger level through said trigger circuit.

7. A DC-DC converter as defined in claim 6, wherein said voltage control circuit comprising a detection circuit for detecting the voltage of said detective winding under the trigger level for driving said control circuit; and a deactivating circuit for discharging the electric charge accumulated in said capacitor to the inoperative level for ceasing operation of the control circuit when said detection circuit detects the voltage of said detective winding under the trigger level.

8. A DC-DC converter as defined in claim 7, further comprising a trigger circuit for supplying electric power from said power source to said control circuit at the beginning of operating said control circuit;

wherein said deactivating circuit discharges the electric charge accumulated in said capacitor to the inoperative level for ceasing operation of the control circuit when said detection circuit detects the voltage of said drive winding under the trigger level after said capacitor is electrically charged to the trigger level through said trigger circuit for activation of said control circuit.

9. A DC-DC converter comprising:

a transformer having a primary winding, secondary winding and a drive winding;

a switching element connected in series to a DC power source and said primary winding;

a first output smoothing circuit connected to said secondary winding and output terminals;

a control circuit for generating outputs to drive said switching element, said control circuit being operable and inoperable when voltages of a trigger level and an inoperative level respectively are applied on said control circuit;

a second output smoothing circuit having a capacitor connected to said drive winding and control circuit for supplying electric power to said control circuit; and a voltage control circuit for detecting output voltage of said drive winding under the trigger level for driving said control circuit;

said voltage control circuit comprises a detection circuit for detecting the voltage of said drive winding under the trigger level; and a deactivating circuit for discharging the electric charge accumulated in said capacitor to the inoperative level for ceasing operation of the control circuit when said detection circuit detects the voltage of said drive winding under the trigger level.

10. A DC-DC converter as defined in claim 9, further comprising a trigger circuit for supplying electric power from said power source to said control circuit at the beginning of operating said control circuit;

wherein said deactivating circuit discharges the electric charge accumulated in said capacitor to the inoperative level for ceasing operation of the control circuit when said detection circuit detects the voltage of said drive winding under the trigger level after said capacitor is electrically charged to the trigger level through said trigger circuit for activation of said control circuit.

11. A DC-DC converter comprising a transformer having a primary winding, secondary winding, a drive winding and a detective winding;

a switching element connected in series to a DC power source and said primary winding;

a first output smoothing circuit connected to said secondary winding and output terminals;

a control circuit for generating outputs to drive said switching element, said control circuit being operable and inoperable when voltages of a trigger level and an inoperative level respectively are applied on said control circuit;

a second output smoothing circuit having a capacitor connected to said drive winding and control circuit for supplying electric power to said control circuit;

a detective smoothing circuit connected to said detective winding; and a voltage control circuit for detecting output voltage of said detective winding under a trigger level for driving said control circuit, said drive winding for supplying electric power to said control circuit; and said voltage control circuit comprising a detection circuit for detecting the voltage of said drive winding under the trigger level; and a deactivating circuit for discharging the electric charge accumulated in said capacitor to the inoperative level for ceasing operation of the control circuit when said detection circuit detects the voltage of said detective winding under the trigger level.

12. A DC-DC converter as defined in claim 11, further comprising a trigger circuit for supplying electric power from said power source to said control circuit at the beginning of operating said control circuit;

wherein said deactivating circuit discharges the electric charge accumulated in said capacitor to the inoperative level for ceasing operation of the control circuit when said detection circuit detects the voltage of said detective winding under the trigger level after said capacitor is electrically charged to the trigger level through said trigger circuit for activation of said control circuit.

13. A DC-DC converter as defined in any one of claims 9, 11, 3 and 6, wherein said voltage control circuit is operable to increase the output voltage of the second output smoothing circuit when said drive winding produces the voltage above the trigger level.

* * * * *